United States Patent
Yang et al.

(10) Patent No.: US 8,553,571 B2
(45) Date of Patent: Oct. 8, 2013

(54) AUTO REPLY AND LOOP-BACK METHOD FOR THE REMOTE MEASUREMENT OF THE QUALITY OF AN INTERNET PHONE

(76) Inventors: Sun Joo Yang, Sungnam-Si (KR); Joo Young Kim, Seoul (KR)

(*) Notice: Subject to any disclaimer, the term of this patent is extended or adjusted under 35 U.S.C. 154(b) by 65 days.

(21) Appl. No.: 13/261,094

(22) PCT Filed: Jul. 9, 2010

(86) PCT No.: PCT/KR2010/004473
§ 371 (c)(1),
(2), (4) Date: Dec. 20, 2011

(87) PCT Pub. No.: WO2011/010820
PCT Pub. Date: Jan. 27, 2011

(65) Prior Publication Data
US 2012/0093006 A1    Apr. 19, 2012

(30) Foreign Application Priority Data
Jul. 24, 2009    (KR) ........................ 10-2009-0068015

(51) Int. Cl.
| | |
|---|---|
| *H04L 1/00* | (2006.01) |
| *H04L 1/24* | (2006.01) |
| *H04M 1/24* | (2006.01) |
| *H04L 12/26* | (2006.01) |
| *H04M 3/26* | (2006.01) |

(52) U.S. Cl.
CPC ............ *H04L 43/0864* (2013.01); *H04L 43/50* (2013.01); *H04M 1/24* (2013.01); *H04M 3/26* (2013.01)
USPC .......... 370/249; 370/241; 379/21; 379/22.01

(58) Field of Classification Search
USPC .............. 370/241, 249; 379/1.01, 21, 22.01, 379/27.01
See application file for complete search history.

(56) References Cited

U.S. PATENT DOCUMENTS

| | | | |
|---|---|---|---|
| 2006/0245368 A1* | 11/2006 | Ladden et al. ................. | 370/248 |
| 2008/0013534 A1* | 1/2008 | Tsuzuki et al. ................ | 370/389 |
| 2009/0129557 A1* | 5/2009 | Carter et al. ................. | 379/22.01 |
| 2009/0161565 A1* | 6/2009 | Reniere et al. ................ | 370/249 |

\* cited by examiner

Primary Examiner — Paul H Masur
(74) Attorney, Agent, or Firm — GWIPS

(57) ABSTRACT

A method of automatic response and loop-backing is developed for remotely measuring the quality of the Internet telephone by IP phone. When a quality measuring instrument is requested to measure the quality of Internet telephone, a request call is placed to an IP phone for quality measurement. The method of automatic response and loopback is enable the IP phone to handle the call for quality measuring without interrupting the user of IP phone without affecting utilization of supplementary Internet telephone services.

2 Claims, 3 Drawing Sheets

AUTO REPLY AND LOOP-BACK METHOD FOR THE REMOTE MEASUREMENT OF THE QUALITY OF AN INTERNET PHONE

BACKGROUND OF THE INVENTION

1. Field of the Invention

The present invention relates to an automatic response and loopback method for remote quality measurement in Internet telephony and, more particularly, to an automatic response and loopback method for remote quality measurement in Internet telephony wherein a quality measurement instrument wishing to measure Internet telephony quality can place a call to an Internet phone without causing inconvenience to the user of the Internet phone and without affecting utilization of supplementary Internet telephony services.

2. Related Prior Art

In recent years, Internet phones (IP phones) that deliver voice and video calls through the Internet have been rapidly popularized.

Unlike standard telephones using public switched telephone networks (PSTN) based on circuit switching, IP phones use IP networks (IP addresses) based on packet switching.

IP phones may be divided into wired VoIP (Voice over Internet Protocol) phones and wireless Wi-Fi (wireless fidelity) phones. Reduction in network investment costs due to integration of telephone networks and data networks, reduction in management costs and increase in efficiency owing to construction of integrated networks, and easy adoption of Internet-based multimedia services such as video conferencing are expected to rapidly increase the number of IP phones in the near future.

Unlike the PSTN using dedicated lines, IP networks using flexible lines may experience high packet loss and significant delay depending upon network traffic. In comparison to PSTN telephony, IP telephony tends to be poor in terms of quality of service (QoS) and hence needs more accurate QoS measurement.

That is, VoIP services requiring strict real-time properties may experience significant quality degradation owing to real-time limitations of IP networks. Hence, it is necessary for VoIP service providers to continuously perform quality measurement and failure analysis to resolve customer dissatisfaction due to quality degradation in voice communication and to ensure an effective level of voice communication quality for customers.

As part of an effort to ensure IP telephony quality, in a related art method for measuring IP telephony quality, a maintenance technician carrying a measurement instrument is dispatched to a site where a quality problem has occurred and measures IP telephony quality using the measurement instrument. This method is inefficient in terms of time and cost.

In another related art method for remote real-time quality measurement, a quality measurement instrument is installed in a management center and a measurement function is realized in IP phones. Later, to measure IP telephony quality in real-time, the quality measurement instrument installed in the management center may send a quality measurement request to a particular IP phone and analyze looped back results from the IP phone.

SUMMARY OF THE INVENTION

For remote quality measurement, the IP phone must automatically respond to the quality measurement request without human intervention and loop back received data to the quality measurement instrument. This process should not cause inconvenience to the user and not interrupt various supplementary services in use.

However, the related art quality measurement method may fail to specify how to measure quality using automatic responses. In addition, the related art method based on loopback may have to usepackets having a size larger than that of standard real-time transport protocol (RTP) packets used in IP telephony to measure two-way quality. This may produce measurement results incommensurate with actual situations owing to the increased RTP data size. When the standard RTP data size is used, the related art method may produce incomplete measurement results covering not two-way quality but one-way quality only.

The present invention is conceived to solve the above problems, and one aspect of the present invention is to provide an automatic response and loopback method for remote quality measurement in Internet telephony that implements automatic response and loopback functions for an IP phone so that remote quality measurement may be conducted to produce two-way quality results without causing inconvenience to the user of the IP phone, without interrupting supplementary IP telephony services and without violating the RTP standard for IP telephony.

In accordance with one aspect of the invention, an automatic response and loopback method for remote quality measurement in Internet telephony includes: (A) receiving, by a first IP phone 200a, a call requesting quality measurement from a measurement instrument 290 (S310), and analyzing the received call to check whether the received call is a call for remote quality measurement (S320); (B) responding to, by the first IP phone 200a, the call requesting quality measurement by sending a connection signal having a loopback indication and a loopback mode indication without sending a ring signal (S350); (C) sending, by the measurement instrument 290, an RTP packet to the first IP phone 200a (S360), and checking, by the first IP phone 200a, whether a loopback mode set during call reception for remote quality measurement and connection signal transmission is IP packet loopback or media loopback (S370); (D) immediately sending, when the loopback mode is IP packet loopback between a jitter buffer 201 and an IP network 270, by the first IP phone 200a, a loopback RTP packet whose header is a newly created RTP header and whose payload is a copy of the payload of the received RTP packet to the measurement instrument 290 (S373); and (E) terminating, when a regular call is received or is placed during handling of the call for quality measurement, by the first IP phone 200a, the call for quality measurement and processing the regular call first (S380).

Preferably, the automatic response and loopback method further includes (A1) deactivating, when the received call is a call for remote quality measurement after checking in (A), by the first IP phone 200a, a ring generator 211, which notifies call reception, and a caller number display 213, which displays a caller number associated with a received call (S330).

Preferably, the automatic response and loopback method further includes (A2) deactivating, when the received call is a call for remote quality measurement after checking in (A), by the first IP phone 200a, a voice activity detector 207, which transmits silence packets, and an echo remover 209, which detects and removes echo in a voice signal, so as to successfully loop back data for the call received from the measurement instrument 290 to the measurement instrument 290 (S340).

Preferably, the automatic response and loopback method further includes (D1) sending, when the loopback mode is media loopback between an encoder/decoder 203 and a POTS network 205 after checking in (C), by the first IP phone 200a, a loopback RTP packet whose header is a newly created RTP header and whose payload is a copy of the decoded payload of the received RTP packet after passing through the encoder/decoder 203 to the measurement instrument 290 (S375).

Preferably, in (E), when a call for quality measurement is received during a regular call, the first IP phone 200a rejects the call for quality measurement by returning a cause code other than a cause code corresponding to "busy" so as not to disrupt supplementary services like "call waiting".

According to the automatic response and loopback method for remote quality measurement in Internet telephony, when an IP phone receives a call for quality measurement from a quality measurement instrument, the IP phone may disable ring signaling and calling number identification so as not to cause inconvenience to the user of the IP phone.

Even when the user of the IP phone uses a supplementary service such as a ringback tone service, it is possible to accurately measure IP telephony quality without disrupting the supplementary service by forcing the IP phone to immediately send a connection signal (for example, SIP 200 (ok) response) instead of a ring signal (for example, SIP 180 (ringing) response). Here, SIP refers to the Session Initiation Protocol that can be used for creating, modifying and terminating multimedia sessions between intelligent terminals on the Internet.

It is possible to increase quality measurement accuracy by forcing the IP phone to deactivate a voice activity detection (VAD) function and by preventing loopback data from being removed through an echo cancellation function, which may recognize loopback data as echo.

When a regular call is placed by the user or is received during quality measurement, the call for quality measurement is terminated. When a call for quality measurement is received during a regular call, the call for quality measurement is rejected with a cause code other than a cause code corresponding to the SIP 486 (busy) response. Hence, it is possible to perform quality measurement without disrupting supplementary services in use and without interrupting call handling of the user.

In addition, as the size of loopback RTP payload is identical to that of standard RTP payload, it is possible to perform quality measurement in an actual service environment.

The above and other aspects, features and advantages of the invention will be more clearly understood from the following detailed description of exemplary embodiments taken in conjunction with the accompanying drawings.

DETAILED DESCRIPTION OF THE PREFERRED EMBODIMENTS

Hereinafter, an automatic response and loopback method for remote quality measurement in Internet telephony of the present invention will be described in detail with reference to the accompanying drawings.

First, a description is given of a system employed for the automatic response and loopback method for remote quality measurement in Internet telephony of the present invention.

Figure 1:
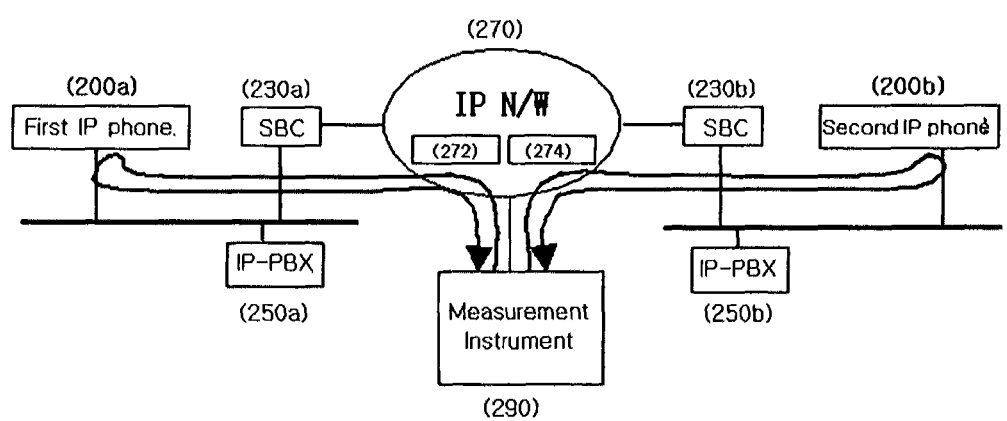
FIG. 1 illustrates a system configuration supporting an automatic response and loopback method for remote quality measurement in Internet telephony according to an embodiment of the present invention.
Figure 2:
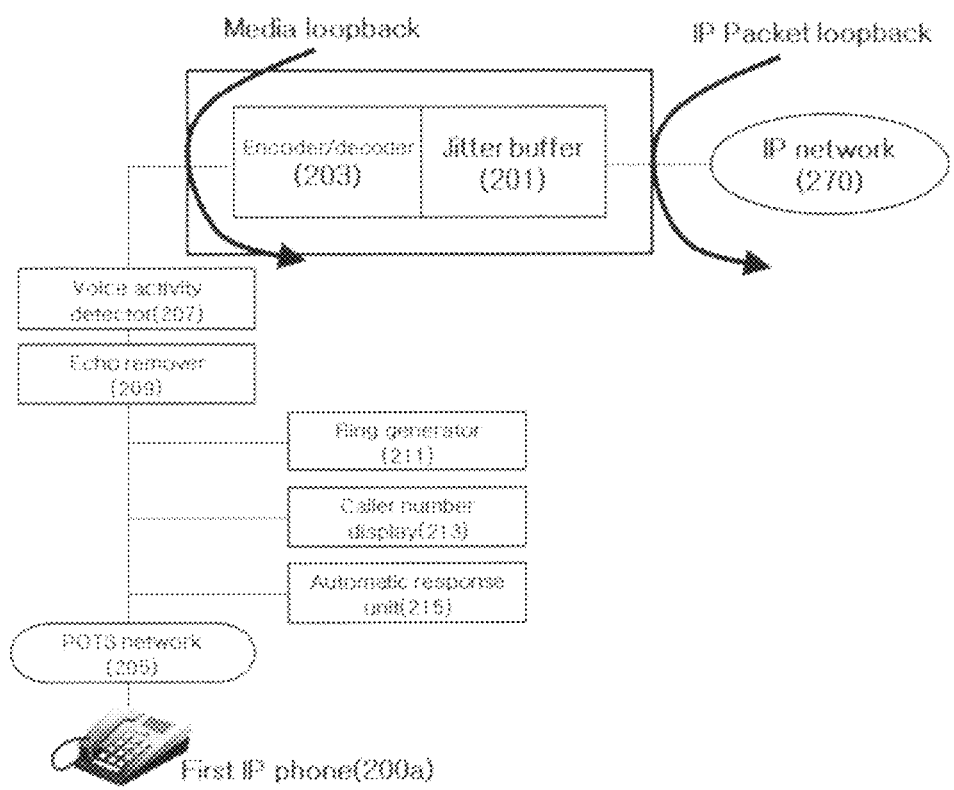
FIG. 2 illustrates a detailed configuration of an IP phone used in the present invention.

FIG. 1 illustrates a system configuration supporting an automatic response and loopback method for remote quality measurement in Internet telephony according to an embodiment of the present invention, and FIG. 2 illustrates a detailed configuration of an IP phone used in the present invention.

As shown in FIG. 1, the system, which implements the automatic response and loopback method for remote quality measurement in IP telephony according to an embodiment of the present invention, includes a first IP phone 200a, a second IP phone 200b, session border controllers 230a and 230b, IP private branch exchanges 250a and 250b, an IP network 270 and a measurement instrument 290.

More specifically, the first IP phone 200a and the second IP phone 200b send and receive multimedia data such as voice and video data through the IP network 270.

As shown in FIG. 2, each of the first IP phone 200a and the second IP phone 200b includes a jitter buffer 201 for temporarily buffering RTP data such as voice and video data received through the IP network 270 from the measurement instrument 250, an encoder/decoder 203 for decompressing IP data from the jitter buffer 201, a POTS network 205 for receiving the data decompressed by the encoder/decoder 203, a voice activity detector 207 for sending silence packets when a voice signal is not present in the data from the POTS network 205, an echo remover 209 for detecting and cancelling echo in a voice signal from the POTS network 205, a ring generator 211 for generating an alert indicating reception of a call requesting quality measurement coming from the measurement instrument 290, a caller number display 213 for displaying a caller number associated with a call requesting quality measurement coming from the measurement instrument 290, and an automatic response unit 215 for automatically responding to a call coming from the measurement instrument 290.

The jitter buffer 201 and the encoder/decoder 203 constitute a loopback that sends voice and video data received from the measurement instrument 290 back to the measurement instrument 290. Here, loopback performed between the jitter buffer 201 and the IP network 270 is referred to as IP packet loopback, and loopback performed between the encoder/decoder 203 and the POTS network 205 is referred to as media loopback. Loopback is preferably performed at a point near to the POTS network 205 in order to loop back a signal, which is nearly identical to a signal sent to the first IP phone 200a or the second IP phone 200b, to the measurement instrument 290.

Specifically, in IP packet loopback, the first IP phone 200a or the second IP phone 200b sends an RTP (real-time transport protocol) packet received from the measurement instrument 290 performing quality measurement back to the measurement instrument 290 before the RTP packet passes through the jitter buffer 201 or the encoder/decoder 203. Here, the header of the loopback RTP packet is a new RTP header and the payload thereof is a copy of the payload of the received RTP packet. To measure bidirectional quality, the measurement instrument 290 should send an RTP packet that contains sequence number information other than regular voice data as payload data.

That is, upon reception of the loopback RTP packet, the measurement instrument 290 computes RTP loss, delay and jitter (variation of packet delay with time) along the loopback section by analyzing sequence number information in the payload, and computes loss and jitter in the reception direction. As delay and jitter in the transmission direction can be computed on the basis of the loss, delay and jitter along the loopback section and the delay and jitter in the reception direction, the measurement instrument 290 can compute bidirectional qualities.

In media loopback, an RTP packet is looped back after passing through the encoder/decoder 203. Here, as in IP packet loopback, the loopback RTP packet is formed by replacing the header of the received RTP packet with a new RTP header. Media loopback is not applicable to bidirectional quality measurement. The loopback data may be recorded and compared with original voice data to examine the level of distortion.

Referring back to FIG. 1, each of the session border controllers (SBC) 230a and 230b converts signaling data and media data transmitted between the first IP phone 200a and the second IP phone 200b, and acts as a private network interface.

The IP private branch exchanges (IP-PBX) 250a and 250b act as telephony exchanges for the first IP phone 200a and the second IP phone 200b, and conduct PSTN and PBX interworking functions.

The IP network 270 connects the first IP phone 200a and the second IP phone 200b for communication so that the first IP phone 200a and the second IP phone 200b may send and receive multimedia data such as voice and video data.

Here, the IP network 270 includes RTP protocol packets 272 to transport multimedia data such as voice and video data between the first IP phone 200a and the second IP phone 200b, and RTCP protocol packets 274 to control the RTP packets 272.

The measurement instrument 270 places calls for quality measurement to the first IP phone 200a and the second IP phone 200b using an IP data loopback mode to measure quality.

Figure 3:
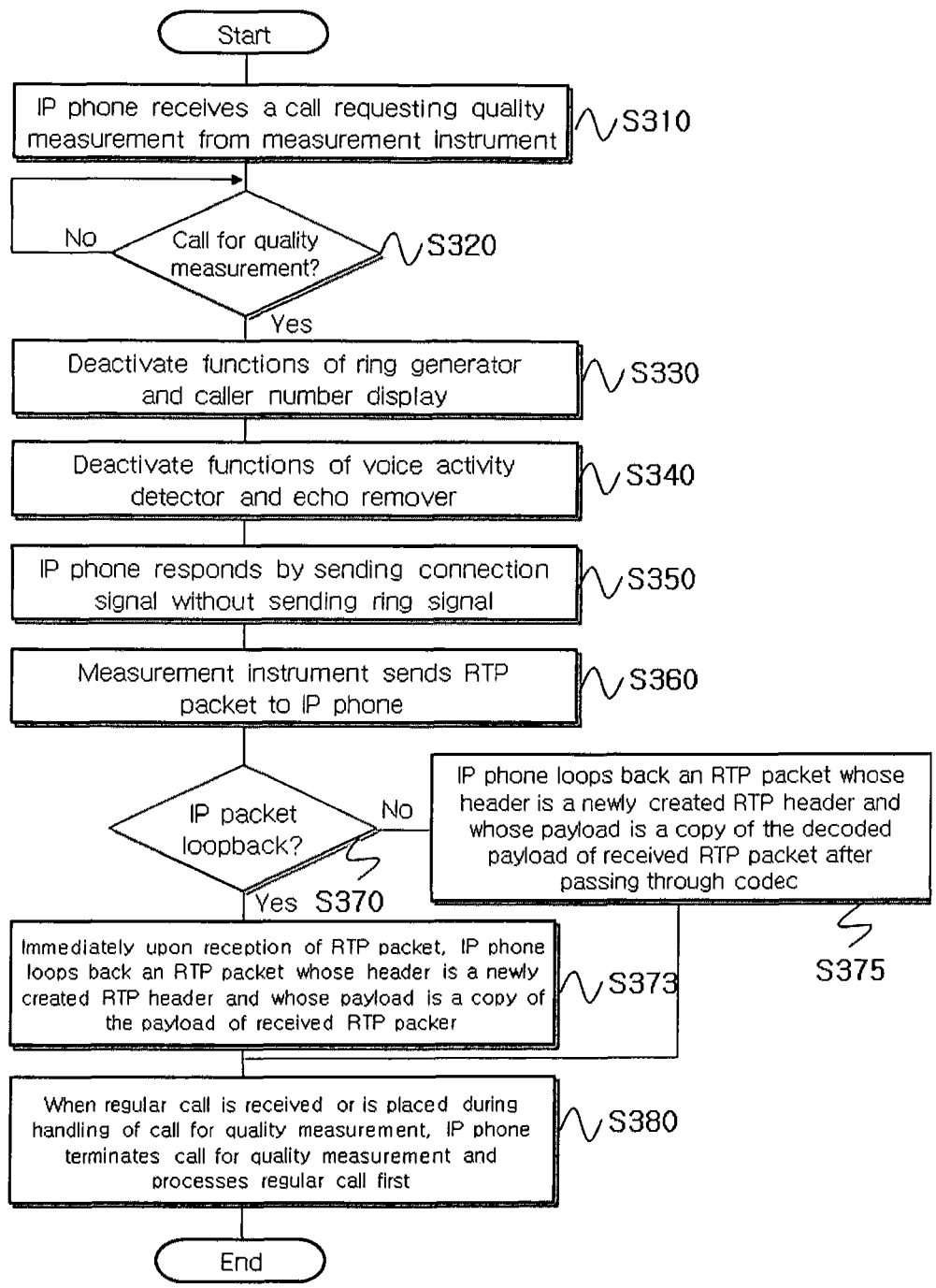
FIG. 3 is a flowchart of an automatic response and loopback method for remote, quality measurement in Internet telephony according to another embodiment of the present invention.

Next, a description is given of an automatic response and loopback method for remote quality measurement in Internet telephony of the present invention with reference to FIG. 3. As the same procedure is applied among the IP phone 200a, the IP network 270 and the measurement instrument 290 and among the second IP phone 200b, the IP network 270 and the measurement instrument 290, the method is described using only the first IP phone 200a, the IP network 270 and the measurement instrument 290.

FIG. 3 is a flowchart of the automatic response and loopback method for remote quality measurement in Internet telephony according to another embodiment of the present invention.

Referring to FIG. 3, the measurement instrument 290 transmits a call requesting quality measurement to the first IP phone 200a (S310). Upon reception of a call from the measurement instrument 290, the first IP phone 200a checks whether the received call is a call for remote quality measurement (S320).

Here, for quality measurement, the measurement instrument 290 transmits a call requesting quality measurement that contains an indicator indicating loopback test and another indicator indicating loopback mode (IP packet loopback or media loopback).

When the received call is a call for remote quality measurement, so as not to cause user inconvenience, the first IP phone 200a deactivates the ring generator 211 (which indicates call reception) and the caller number display 213 (which displays a caller number associated with a received call) (S330).

Additionally, to successfully loop back data as to the received call from the measurement instrument 290, the first IP phone 200a deactivates the voice activity detector 207 (which transmits silence packets) and the echo remover 209 (which detects and removes echo in a voice signal) (S340).

When the user uses a ringback tone service, to prevent a ringback tone transmitted during quality measurement from affecting quality measurement, the first IP phone 200a immediately sends a connection signal (for example, SIP 200 (ok) response) as a response without a ring signal (for example, SIP 180 (ringing) response) (S350).

That is, when the received call is a call for remote quality measurement, the first IP phone 200a skips transmission of a ring signal (for example, SIP 180 (ringing) response) and sends a connection signal (for example, SIP 200 (ok) response) having a loopback indicator and a loopback mode indicator (IP packet loopback or media loopback) through the automatic response unit 215. Alternatively, the first IP phone 200a may send a tentative response signal (for example, SIP 100 (trying) response).

Upon reception of the connection signal from the first IP phone 200a, the measurement instrument 290 sends an RTP packet to the first IP phone 200a (S360). The first IP phone 200a checks whether the loopback mode set during call reception for remote quality measurement and connection signal transmission is IP packet loopback between the jitter buffer 201 and the IP network 270 or media loopback between the encoder/decoder 203 and the POTS network 205 (S370).

When the loopback mode is IP packet loopback between the jitter buffer 201 and the IP network 270, the first IP phone 200a immediately sends a loopback RTP packet whose header is a newly created RTP header and whose payload is a copy of the payload of the received RTP packet to the measurement instrument 290 so that quality measurement is performed in an environment identical to the standard RTP environment (S373).

When the loopback mode is media loopback between the encoder/decoder 203 and the POTS network 205, the first IP phone 200a sends a loopback RTP packet whose header is a newly created RTP header and whose payload is a copy of the decoded payload of the received RTP packet after passing through the encoder/decoder 203 to the measurement instrument 290 so that quality measurement is performed in an environment identical to the standard RTP environment (S375).

Here, in the event that the first IP phone 200a is located on a private network with network address translation (NAT), as an RTP packet sent by the measurement instrument 290 may be unable to reach the first IP phone 200a unless the first IP phone 200a sends an RTP packet first, the first IP phone 200a sends a dummy RTP packet until a first RTP packet is received.

Thereafter, so as not to disrupt call handling of the user, when a regular call is received or is placed by the user during handling of the call for quality measurement, the first IP phone 200a terminates the call for quality measurement and processes the regular call first.

In other words, loopback mode operation may be terminated when the user of the first IP phone 200a picks up the handset to place a call, when a regular call not for quality measurement is received, or when the measurement instrument 290 sends a termination signal.

When a call for quality measurement is received during a regular call, the first IP phone 200a rejects the call for quality measurement by returning a cause code (for example, 406) other than a cause code corresponding to "busy" response (for example, 486) so as not to disrupt supplementary services like "call waiting" (S380).

Although some embodiments have been described herein, it should be understood by those skilled in the art that various modifications, changes, and alterations can be made without departing from the spirit and scope of the invention. Therefore, the scope of the invention should be limited only by the accompanying claims and equivalents thereof.

What is claimed is:

1. A method of automatic response and loopback for remotely measuring the quality of Internet telephone, the method comprising in steps of:

(A) receiving a request call from a measuring instrument (290) by first IP phone (200*a*) to measure the quality (S310), and analyzing the received call to check whether the received call is the call for remotely measuring the quality (S320);

(A1) deactivating when the received call is a call for remote quality measurement after checking in the step A, by the first IP phone (200*a*), a sound generator (211), which notifies call reception, and a caller number display (213), which displays a caller number associated with a received call (S330);

(A2) deactivating when the received call is a call for remote quality measurement after checking in the step A, by the first IP phone (200*a*), a voice activity detector (207), which transmits silence packets, and an echo remover (209), which detects and removes echo in a voice signal, so as to successfully loop back data for the call received from the measurement instrument (290) to the measurement instrument (290) (S340);

(B) responding the request call for measuring the quality by the first IP phone (200*a*), and sending a connection signal with a loopback indication and a loopback mode indication without sound signal (S350);

(C) sending an RTP packet to the first IP phone (200*a*) by the measuring instrument (290) (S360), and checking whether a loopback mode is set by the first IP phone (200*a*) during the call reception for remotely measuring the quality and transmitting the connection signal to the IP packet loopback or media loopback (S370);

(D) sending immediately when the loopback mode is IP packet loopback between a jitter buffer (201) and an IP network (270), by the first IP phone (200*a*), a loopback RTP packet which header is a newly created RTP header and payload is a copy of the payload of the received RTP packet to the measuring instrument (290) (S373);

(D1) sending when the loopback mode is media loopback between an encoder/decoder (203) and a POTS network (205) after checking in the step C, by the first IP hone 200*a* a loopback RTP racket whose header is a newly created RTP header and whose payload is a copy of the decoded payload of the received RTP packet after passing through the encoder/decoder (203) to the measurement instrument (290) (S375); and (E) terminating when a regular call is received or placed during the handling of the call for quality measuring by the first IP phone (200*a*), the call for quality measuring and processing the regular call first (S380).

2. The method of automatic response and loopback according to claim 1, the method further comprising: in the step E, when a call for quality measurement is received during a regular call, the first IP phone (200*a*) rejects the call for quality measurement by returning a cause code other than a cause code corresponding to "busy" so as not to disrupt "call waiting".

* * * * *